United States Patent
Webb (10) Patent No.: US 11,189,191 B2
(45) Date of Patent: Nov. 30, 2021

(54) TOOL FOR REHABILITATING LANGUAGE SKILLS

(71) Applicant: Ayana Webb, Montclair, NJ (US)

(72) Inventor: Ayana Webb, Montclair, NJ (US)

( * ) Notice: Subject to any disclaimer, the term of this patent is extended or adjusted under 35 U.S.C. 154(b) by 268 days.

(21) Appl. No.: 15/939,226

(22) Filed: Mar. 28, 2018

(65) Prior Publication Data

US 2019/0304329 A1  Oct. 3, 2019

(51) Int. Cl.

| | |
|---|---|
| *G09B 19/00* | (2006.01) |
| *A63F 3/04* | (2006.01) |
| *G09B 3/02* | (2006.01) |
| *A63F 9/04* | (2006.01) |
| *A63F 11/00* | (2006.01) |

(52) U.S. Cl.
CPC ............ *G09B 19/00* (2013.01); *A63F 3/0402* (2013.01); *G09B 3/02* (2013.01); *A63F 9/04* (2013.01); *A63F 11/0011* (2013.01); *A63F 2011/0016* (2013.01)

(58) Field of Classification Search
CPC ..................................................... G09B 19/00
USPC .......................................................... 434/169
See application file for complete search history.

(56) References Cited

U.S. PATENT DOCUMENTS

| | | | | |
|---|---|---|---|---|
| 7,203,649 | B1* | 4/2007 | Linebarger | G10L 15/18 704/270 |
| 2012/0021390 | A1* | 1/2012 | Dodd | G09B 19/04 434/185 |
| 2015/0118661 | A1* | 4/2015 | Haruta | G09B 5/00 434/169 |

OTHER PUBLICATIONS

Carrie A. Des Roches, Swathi Kiran. 2017. "Technology-based rehabilitation to improve communication after acquired brain injury" Frontiers in Neuroscience, v. 11, p. 1-17 Lausanne, Switzerland.

* cited by examiner

*Primary Examiner* — Thomas J Hong (57) ABSTRACT

Methods of using a tool for improving language skills comprising selecting a language concept and then a word associated with the language concept; asking the patient to answer a question related to the language concept about the first word; scoring the patient's response to the based upon at least one or more of the following: the number of words given, the number of prompts the patient needed to be provided in order to illicit the first response, the amount of time the patient needed to produce the first response; and then moving the word to a first location, that physically represents to the patient the first word score they achieved. Further aspects involve calculating a total therapeutic session score by totaling up all the individual word scores from the therapeutic session and producing a therapeutic session report. As well as comparing results across sessions.

18 Claims, 3 Drawing Sheets

TOOL FOR REHABILITATING LANGUAGE SKILLS

CROSS-REFERENCE TO RELATED APPLICATIONS

NA

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD

The present application relates to an interactive tool/game that helps people improve or rehabilitate speech and language skills.

BACKGROUND

Aphasia is a disorder caused by injury to parts of the brain that execute language. Brain injuries including stroke, tumor, traumatic brain injury, progressive neurological disorder may affect all or some functions of speech and language. Speaking, understanding, reading and writing are typically affected and impaired.

According to a recent report by the National Stroke Association, approximately 80,000 new cases of Aphasia occur every year, many of which may never fully recover. As a result, according to the National Institute of Neurological Disorders and Stroke Institute, it is estimated that currently 1 million people are living with the condition of Aphasia.

Aphasia varies in level of severity. Yet even mild limitations in communication abilities are disabling and make fulfillment of vocational duties and social interactions impossible for many. Loss of self-esteem and depression are often present.

Virtually all people with aphasia experience word retrieval difficulties. This is when a person is unable to think of a word when it is required and appropriate. For example he or she may want to ask a waiter for a fork, but is unable to execute the precise brain function to access the word, "fork." Word retrieval deficits are often the primary barrier to the flow of speech. It causes tremendous frustration.

One of the most common approaches utilized by speech therapists in aphasia therapy is Semantic Features Analysis (SFA).

SFA is a picture-based technique that is theorized to aid naming ability. A therapist presents a picture to a patient and requests that the patient says the name of the picture. When the patient has difficulty producing the word, the speech therapist prompts the patient to describe features of the object in the picture. These features typically include the following: action (i.e., what it does, or what can be done with it); location (ie., where it can be found); function (i.e., what it is used for); properties (i.e., what it looks like or contains); category (i.e., what group is it a part of); association (i.e., what does it remind you of.)

Patients who have the verbal ability to describe features of the target word may succeed with SFA. There are many patients, however, who are so verbally impaired, that they cannot benefit from SFA. This was the result of an efficacy study that reviewed SFA. The study which was published in 2014 revealed that SFA was "more effective for some PWA [Person with Aphasia] as compared to others." Persons with non-fluent aphasia, meaning an aphasia in which expression is decreased, may not have the expressive ability to meet the requirements of describing features of the target word.

SFA utilizes pictures as the stimulus to elicit speech production. Yet normal conversations and daily communications (email, text . . . etc.) are not picture based. Therefore, there continues to be a need for a written/spoken word tool that can be used to increase word retrieval in a manner consistent with normal conversations and daily communications. And there is a need for a word tool that can benefit persons with various severity levels.

SUMMARY

In order to overcome the deficiencies in the prior art, systems and methods are described herein.

One aspect of the claimed invention involves a method of using a tool for improving language skills comprising: selecting a first language concept and then visually presenting a first word associated with the first language concept to a patient; asking the patient to answer a first question related to the first language concept, about the first word; scoring the patient's response to the question based upon at least one or more of the following: the accuracy of the response, the number of words given in the first response, the number of prompts the patient needed to be provided in order to ellicit the first response, the amount of time the patient needed to produce the first response; and moving the first word to a first location, within the tool, that physically represents to the patient the first word score they achieved.

Another aspect involves further assigning a therapeutic session length that allows for the presentation, scoring, and moving of at least the first word and a second word and calculating a total first therapeutic session score by totaling up all the individual word scores from the first therapeutic session and producing a therapeutic session report.

A further aspect involves conducting a second therapeutic session at a later date that has roughly the same length as the first session and comparing the score between sessions and producing a progress report.

These and other aspects described herein present in the claims result in features and/or can provide advantages over current technology.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages or features are mutually exclusive or contradictory, in that they cannot be simultaneously present in a single embodiment. Similarly, some advantages are applicable to one aspect of the invention, and inapplicable to others. Thus, the elaborated features and advantages should not be considered dispositive in determining equivalence. Additional features and advantages of the invention will become apparent in the following description, from the drawings, and from the claims.

DETAILED DESCRIPTION

As previously stated, there continues to be a need for a written/spoken word tool that can be used to increase word retrieval in a manner consistent with normal conversations and daily communications.

The tool described herein addresses this limitation because it is based on spoken and written stimuli. These stimuli expose the patient to auditory and written language models that stimulate the patient's cognitive processes and eventual access to his semantic network. Pictures and images are limited in this respect. This is why patients with less expressive ability do poorly with SFA. This is why it is critical that an alternative and more powerful process become available to the public.

The tool helps patients to improve their verbal output via the routine mode of using language in a conversation.

Importantly, since it is not a pictured based tool, it activates different cognitive pathways. It allows patients to create their own mental images and thereby increases the likelihood of word recall, because the patient is using self-developed image, rather than those forced upon him.

For example, if a patient is shown the word "DRESSER." The patient has the freedom to recover any mental image of a dresser that he or she has actually seen, or one that is perhaps in his or her own home. The personal experience of the patient creates salience that strengthens the patient's ability to access linguistic expressions of this experience, both during and after use of the tool.

Further, the tool described herein seeks to unburden the cognitive load that many patients experience in therapy by increasing the patient's success in accessing a particular aspect of a word association. As will be described, the patient can use the same stimulus, yet produce various verbal levels, including one word utterances, two word combinations, phrases, and/or sentences.

Because language is far more than just nouns and verbs, by selection of appropriate stimulus words, the tool can be used to help patients confront word retrieval difficulties across word categories that include animate and inanimate objects. As such, they extend beyond the limitations of simply helping people recall names of nouns (or verbs).

In general, the tool described herein is designed to quantify patient progress such as how many words the patient recalls in a session; what level of speech the patient used (i.e., word, phrase, sentence); and the level of assistance that the patient needed. The tool contains a scoring component that helps the patient, clinician, and possibly third parties to know measurable status on word recall and verbal output abilities.

Importantly, the tool also builds/rebuilds cognitive skills of the patient. Language is supported by cognitive function. The tool requires the patient to perform tasks such as matching colors, reading, responding to questions, following game routine, and turn-taking. These responsibilities mandate immediate retention of information, so even memory gets a tune-up.

The tool gives the therapist feedback on the patient's cognitive-linguistic function on a wide variety of communication tasks. These include speech, voice, fluency, expressive language (vocabulary, grammar syntax), comprehension of spoken and written language, social-pragmatics, and reading. The therapist can use this feedback to address and or document deficits across the spectrum of language.

The tool also facilitates for the patient improved meta-linguistic skills. The ability to think about language improves because the clinician makes scoring of the responses transparent. The patient experiences throughout use of the tool quantification of his responses. He becomes aware of how to alter language for a specific therapy goal. His awareness helps his self-correct (i.e., patient at times may be asked to make longer utterances . . . "you said two words can you answer in a sentence?").

Having described the tool in broad terms, exemplary embodiments will now be presented.

The tool, and method of using that tool, described in this document allow a therapist (or other caregiver, such as a family member, or an AI implementation of therapist) to help a patient improve or rehabilitate their language skills. [Note: unless stated otherwise, the term "therapist", as used in this document, is inclusive of therapists; other caregivers, such as a family member, and even AI implementation of therapist.]

The tool can be implemented as a board game (or modularized components thereof) or as computer implemented system (e.g. a mobile or web based app), where the computer implemented system comprises one more computer processors, configured to execute computer code, and computer code configured to run on the one or more computer processors, which may include an AI implementation of a therapist.

The importance not being the specific implementation of the tool but that the tool is configured to allow a therapist (or the patient) to select between at least two or more semantic concepts (to be described shortly); allow for the visual presentation of a word associated with the language concept to be presented to the patient; the tool must then be able to facilitate a conversation (or question-response sequence) between the therapist and the patient, which allows the therapist to score the answers given by the patient about the word related to the semantic concept; and the ability to move the word to a new physical location (inclusive of orientation) that indicates the score received by the patient for that answer.

Additionally, it is beneficial that the therapist be able to determine a session length. The session length can be based upon an increment of time, e.g. approximately 25 minutes (or less), based upon a metric associated with the number of words presented (e.g. 10 words), outcomes based (e.g. when a total score of 55 or more is achieved), or patient specific (e.g. when the patient reports they are starting to tire). The tool can be used to either present multiple words related to a single language/semantic concept or to allow the selection of one or more additional semantic concepts (and the presentation of their associated words) to facilitate a full therapy session. A score for a full session is determined by summing up the scores for the individual words (and any bonus or penalty points accessed), which the therapist then documents in a report presented to the patient (or other interested party such as the patient's insurance company).

Further, it is also beneficial to allow scores of therapy sessions of a similar session length (or average) to be compared across sessions, such that progress (or the maintenance of current skills) can be documented across sessions in a report presented to the patient (or other interested party such as the patient's insurance company).

Figure 1A:
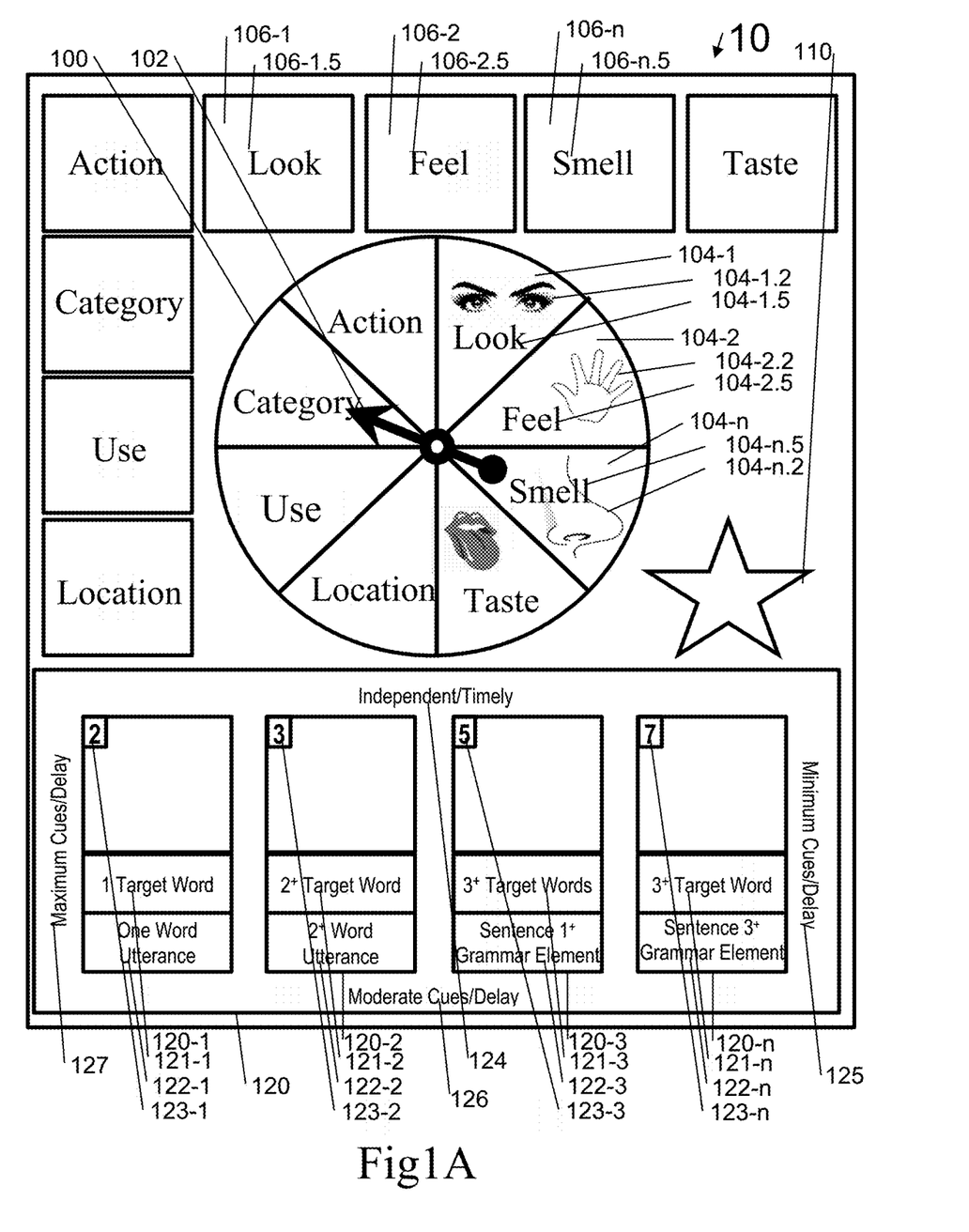
FIG. 1A-C show, in simplified for, an example tool implemented as a board game.
Figure 1B:
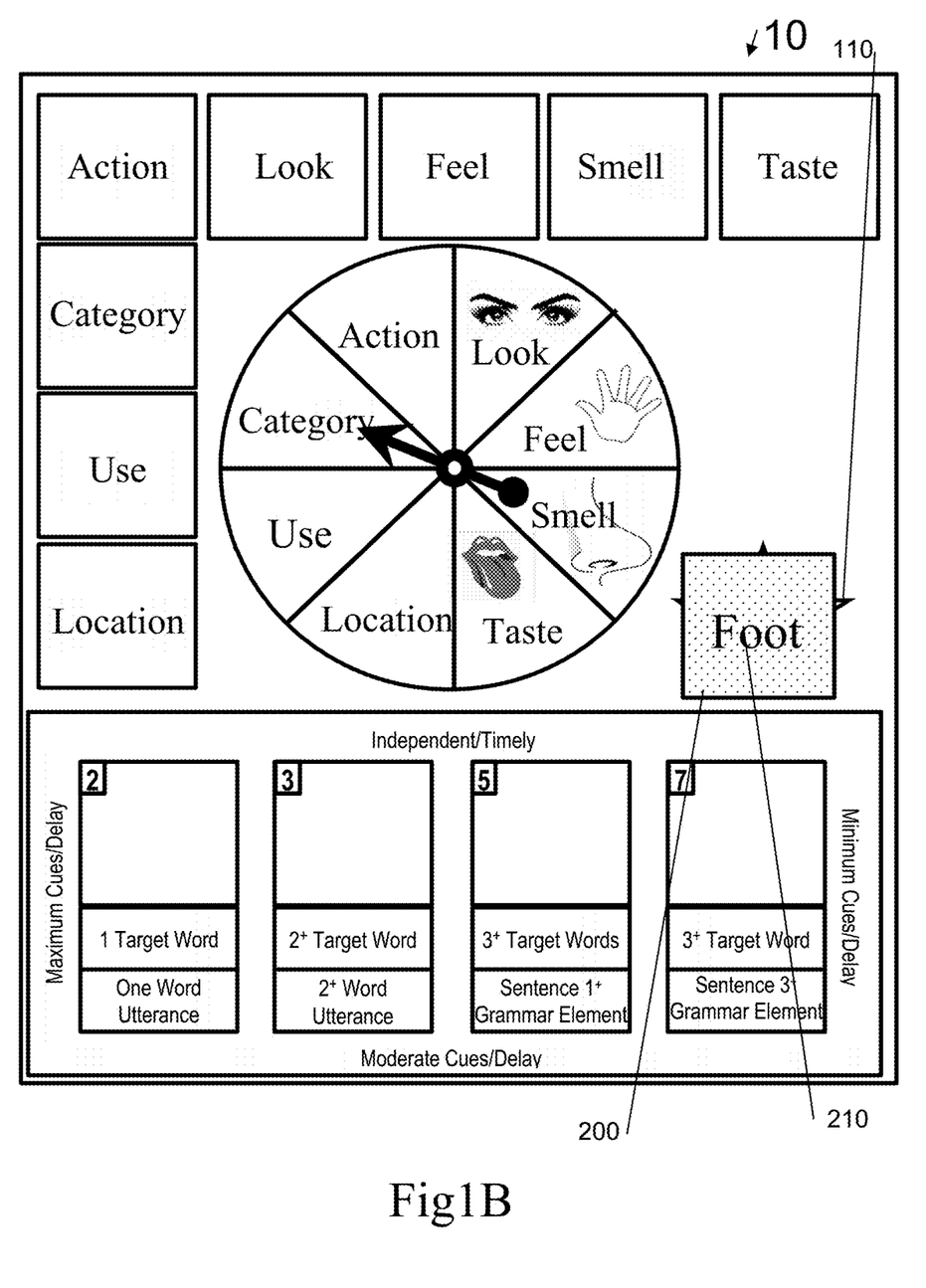
Figure 1C:
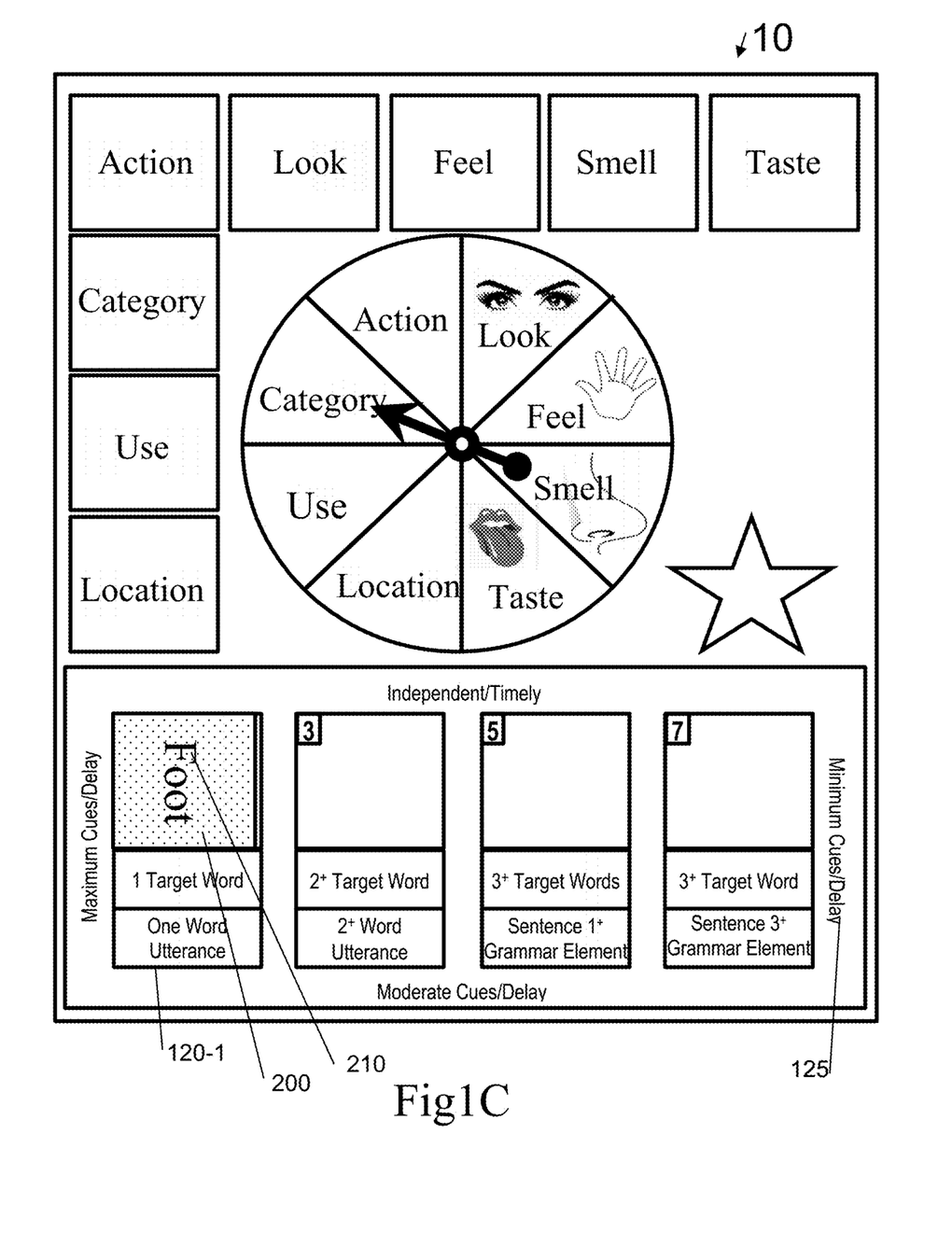

FIG. 1A-C show, in simplified form, an example tool implemented as a board game 10.

FIG. 1A shows an exemplary tool implemented as a board game 10. [Note: while a board game will be discussed, it is anticipated that the board game can also be broken up into its constituent parts.] The board game has a semantics concept selection tool 100, which in this case has eight semantic concepts options, indicated by the words "Look"

104-1.5, "Feel" 104-2.5, "Smell" 104-n.5, "Taste", "Location", "Use", "Category", and "Action".

[Note: Although, possible to create a tool that has only a single semantic concept option, or to break up the tool into single options, we believe it is important that there be at least two (a first and a second) semantics concepts options 104-1, 104-2 to select from. This is because no single concept option will work in all situations. While it is possible to have an unlimited number of semantic concept options. In practice, the eight categories indicated have been clinically shown to provide good clinical outcomes.]

Each semantic concept option can have one or more attributes. For example, the first semantic concept option 104-1 is labeled with the word "Look" 104-1.5, it has a pictorial representation 104-1.2 of two eyes. The second of the at least two semantic concept options 104-2, is also represented as having both a label "Feel" 104-2.5 and a pictorial representation 104-2.2 of hand. It is worth noting that in both cases is highly likely that only one of the attributes would have been necessary to identify the semantic option for the patient. A third semantic concept option 104-n is being used to represent any number of semantic concept options greater than two and it is also represented as having both a label, "Smell" 104-2.5, and a pictorial representation 104-2.2 of nose. As with the previous semantic concept options, typically is only necessary to have one attribute in order for a patient to be able to differentiate one from another.

One extremely useful attribute, which is not represented in the figures, is the use of color. Color is particularly powerful because the ability to differentiate/match color often remains even if word based language skills have diminished. As such, it is highly recommended that a color be an attribute that is associated with each semantic concept option.

The semantics concept selection tool 100 need not be a spinner. Other examples include a coin which could be used it there are only two semantic options to select from and dice are particularly useful tool for adding randomness, with 4, 6, 8, 10, 12, and 20 sided dice being common. In a computer implemented system comprises, a random number generator can be implemented in the code to randomly select between options. The importance not being the particular selection tool being used but that there is an ability to select between semantic concept options. Additionally, if there is a degree of randomness associated with the selection process then it increases the "fun factor" and improves patient engagement.

Returning to the description of FIG. 1A, associated with each of the semantic concept options is a corresponding word deck locations. This is represented by the fact for the first semantic concept option 104-1 there is corresponding word deck locations 106-1 that is indicate to correspond by having a matching attribute, which in this example is that it is also labeled with the word "Look" 106-1.5. Similarly, for the second of the at least two semantic concept options 104-2, there is also a corresponding word deck locations 106-2 that is also labeled with the word "Feel" 106-2.5. Likewise, the third semantic option 104-n (representing any number of semantic concept options greater than two) has a corresponding word deck locations 106-n that is indicate to have at least one matching attribute, the word "Smell" 106-n.5 in this case. Again, it bears repeating that color is a very helpful attribute to use on both the semantic concept options and the corresponding word deck location and, while not shown, its use is highly recommended and could be used with or without a word label.

The word deck locations are designed as places to locate physical word cards, which contain stimulus words upon one of the card faces. The stimulus words are used during the conversation portion and are specific to each semantic concept option.

The "L" shaped configuration shown in FIG. 1A is one of many possible configurations. In particular, when the tool is broken up into modularized components (and if the 8 semantic concept options shown are used) then 2×4 matrix has proven to be effective.

It is worth noting that with computer implemented systems, it isn't necessary to simulate piles of word cards. Instead, once a semantic concept option has been selected, then the stimulus word, which may or may not be represented as being on a card, would typically just appear on the screen.

However, in the case of physical word cards, the word cards can either be placed face-down or face-up. [Note: In the case of the word being face-up, then it is highly desirable that a color is an attribute of each semantic concept option and that the associated color is also at least on the front face of each word card.]

Once a semantic concept option has been selected the associated word card will be identified, which the therapist will then use to facilitate a conversation between the therapist and the patient by posing a question to the patient. Note, if the word cards are face-down then it is often advantageous to have a starting location to move the word cards to.

In FIG. 1A, a board game location 110 is shown a being represented with a star graphic. While this location can have multiple uses, it will first be discussed as a starting location for when the word cards start face-down.

In FIG. 1B, is shows a word card 200, with the stimulus word "Foot" 210, placed onto of the star 110 as a starting location. (Note: another typical starting location can also be in the individual's hand.)

The table below shows a list of 5 representative stimulus words each of the semantic concept options: "Look" 104-1.5, "Feel" 104-2.5, "Smell" 104-n.5, "Taste", "Location", "Use", "Category", and "Action". Additionally, the table below also contains sample desired target response that the therapist is hoping to solicit.

| Semantic Concept | Stimulus Word(s) | Sample Target Responses |
|---|---|---|
| Feel/ Emotion | BULLY | scared/afraid/upset/sad/angry/very sad/very scared/feel afraid/A bully is scary/I would feel, afraid and nervous. |
|  | RAIN | wet/water/like water/wet, watery/Rain is wet. Rain feels like water./Rain feels like water and it's wet. |
|  | ALLEY at night | scary/afraid/fearful/sad/afraid, scared/ afraid and scared/I'm scared/The alley is scary/It's scary and fearful./An alley at night is frightening because you're scared. |
|  | COTTON | soft/squishy/good/nice soft and good/ squishy-like; real soft; so nice/Cotton is soft/soft, nice, good, gentle/nice to touch/ Cotton feels so soft and squishy |
|  | THORN | ouch/hurts/painful/it hurts/pointy and hurtful/not good/It will hurt/point, like a needle./Like something really hurtful/A thorn feels awful |
| Smell | BAKERY | good/yummy/delicious/yummy and good/smells nice/It's yummy smelling/ So good like a muffin./A bakery smells very delicious/It smells good like cake. |
|  | PAINT | strong/tough/strong, too much/like a chemical/Paint smells strong/It is hard to |

-continued

| Semantic Concept | Stimulus Word(s) | Sample Target Responses |
|---|---|---|
| | RESTAURANT | breathe/Paint smells like a chemical food/flavor/good/very good/like food/like french fries/It smells like food/Like you can eat/A restaurant smells good. |
| | CIGARETTE | smoke/strong/bad/smoky/stink/like smoke/like a fire/like it's burning/It smells smoky/Like you lit a fire/A cigarette smells like something is burning |
| | POPCORN | butter/good/like butter/sweet and buttery/smells good/smells like butter/It smells delicious/Popcorn smells like butter |
| Taste | SYRUP | sweet/good/candy/like candy/delicious, sweet, good/It's delicious, like candy/It is very sweet/Syrup tastes good and sweet./Syrup has a delicious taste. |
| | ICE CREAM | sweet/good/milky/cold/yummy, good, sweet/It's good/It's like sweet milk/It's so cold and delicious./Ice cream taste sweet and delicious/It tastes very cold and sweet |
| | HERSHEY'S KISS | chocolate/good/yummy like chocolate/sweet, chocolatey, good/It's very good like chocolate/It taste delicious and sweet/Hershey's Kiss is delicious and has a taste of chocolate |
| | PIZZA | good/cheesy/yummy/cheesy and good/tomato and cheese/Pizza's very good and yummy/I love it, It's cheesy./Pizza tastes like really good and cheesy |
| | MEDICINE | yucky/bad/maybe fruity/good of it's sweet/disgusting/Oh it tastes bad |
| Use | PEN | write/spell/draw/write and draw/write, draw/You write/You write with it/You can write/You can use a pen to write. |
| | LEASH | tie/hold/control/tie and hold/hold down/You put it on a dog/Use a leash so you can walk a dog |
| | KISS | affection/love/show love/to feel better/Kiss to show love/Kiss a person to show you love him. |
| | POOL | swim/water/swim and relax/Swim in a pool/Pools are used for swimming and enjoying |
| | SCHOOL | learn/to learn/to learn to read/to help children/to become smart/School is for learning/So you can be somebody |
| Category | BRACELET | jewelry/art/for your wrist/jewelry, art/A bracelet is jewelry./A bracelet is a type of jewelry/You can wear a bracelet for jewelry. |
| | REFRIGERATOR | appliance/kitchen appliance/things in a kitchen/A refrigerator is an appliance. |
| | CALIFORNIA | state/place/location/a US state, part of west/a state in US/it's a state, one of 50 states/a west coast state/California is one of fifty states. It is an example of a state. |
| | TURQUOISE | color/color, green family/a color/It's a color/It's in the color category/Turquoise is a type of color |
| | AUNT | family/relative/sibling/someone in your family/a family person/An aunt is a family member |
| Action | DOCTOR | heal/help/save/make well, help people/save people/help people get better/help people to live/A doctor's job is to heal people. |
| | SCISSOR | cut/separate/cut and separate/It cuts/cut, divide/It cuts paper/A scissor cuts paper and cardboard. |
| | BABY | cries/poops/eats/sleeps/cries, eats, poops/sleep/It cries and eats./A baby usually cries, eats, poops, and sleeps. |
| | CITY BUS | drives/transports/moves/drives people/transports, drives/makes stops/goes around city/moves people around/stops through city/gets people around/A city bus transports people through city. |

| Semantic Concept | Stimulus Word(s) | Sample Target Responses |
|---|---|---|
| | TELEVISION | watch/shows/turns on/it turns on, you watch it/has shows/shows channel turns on, shows things/you can watch it/you can see different shows/You can watch a television/A television can entertain people who watch it |
| Look | PENCIL | long/yellow/wooden/lead/stars/pointy/it's long/long and yellow/skinny with a point/pointy, sharp/A pencil has a point/sometimes it is yellow/A pencil can have different colors, but it is long and skinny. Usually a pencil is sharp and narrow. |
| | DOG | furry/legs/ears/nose/tail/furry skin/waggy tail/long nose and teeth/has four legs/It has four legs/It's furry with big teeth./A dog looks different ways, but has four legs. |
| | KINDERGARTEN | kids/teachers/big/classes/little kids everywhere/children's books/kids, teachers, toys/It has many children/a place that's busy with kids/It is place filled with beautiful laughing kids/You would see many little kids learning ABCs. |
| | SHIRT | buttons/sleeves/may have buttons/maybe a pocket/something for your arms/has a color/A shirt can be any color. |
| | BOOK | pages/has pages/like a rectangle/words are on it/lots of words/A book can be big or small/It has many words |
| Location | DRESSER | house/store/eats/sleeps/furniture store/home, furniture store/wood shop/in a house/It's in a furniture store/A dresser could be caught in a furniture store/A dresser is usually in a bedroom. |
| | ELEPHANT | forest/zoo/circus/Africa/a forest, a zoo/in Africa/jungles of Africa/Elephants live many places./Most elephants live in Africa/Many circuses cannot have elephants now. They are banned |
| | QUEEN ELIZABETH | London/palace/Europe/in London/palace in London/Britain, London/She lives in that palace. She's in London/Queen Elizabeth lives in Britain/She lives in the Royal Palace. |
| | FORK | kitchen/plate/drawer/kitchen drawer/on a plate with food/in a meatball/next to the spoon/A fork is in the sink/A fork, if it's dirty is in the sink/You have to get it from the kitchen drawer |
| | BOOK | shelf/library/school/in a school/on a shelf/at a cafe/A book can be anywhere. |

Once the word card has been selected then the goal is for the patient to produce verbal output in response to question related to the semantic concept and the stimulus word.

While the therapist should vary the conversation, as clinically appropriate, the following represents a typical conversation with a patient.

The conversation begins by having the patient read the stimulus word (with the clinician assisting the patient as necessary).

It is important that the clinician makes sure that the patient understands the stimulus word. This can be done by asking to the patient, "Do you understand [stimulus word]? If the patient appears unsure, it is recommend that another word card should be selected and the fact that a patient did not understand the word should be recorded in the report for the session.

In this example, assuming the selected semantic concept option is "Category" as represented in FIG. 1B and that the word card 200 with the word "Foot" 200 displayed on it has already been place on the stating location 200. The goal is that the patient articulates the relationship between the stimulus word and the sematic concept. As such, the clinician may start to conversation by saying, "Category means group, a group of things that have something in common. So tell me what category, or group, does a 'foot' belong to?"

The clinician should help the patient arrive at a correct answer with prompts, as necessary. It is also recommended to provide an example to help the patient, if the patient delays in giving a response. For instance, the clinician may make up an example with a word of her own (e.g. "If the word was 'watch', a watch is a part of the category or group of jewelry. Or if 'banana'. A banana is a part of the category or group of fruit."

In response, the clinician can expect the patient to say a word, or words, that contain a target response. In this example, sample target responses include "body"; "the body"; "body part"; "limbs"; "things that are in pairs"; "things to help you walk."

Note: if the patient is unable to produce an appropriate response, even after prompts have been given, then the therapist can give the answer and ask the patient to repeat the answer. In this particular case, this would be a non-scoring response.

Once an answer (or answers) have been given the response needs to be scored. While a binary scoring of yes/no was a target response given this provides very little information. Instead, a simple but highly effective scoring method will be presented that has been shown to improve language function of patients with Aphasia.

This scoring method ideally does the following: keeps track of points achieved by a player of the game; keeps track of the degree of assistance (or cues) that a patient required to produce a target response; records the delay, if any, that occurs from the time a question is posed and when an answer is given; allows the therapist to track, record, and account for progress of language function; it organizes the game results such that the therapist/patient can easily identify language elements that are problematic or impeding gains; and creates real time results that the therapist/patient to direct or re-direct language treatment based how a patient scores.

We will now discuss in more detail one such method. The scoring method to be discussed is a four-step process step: 1) determining the quality of the response, 2) determining the level of assistance needed, 3) determining the delay in producing the response, and 4) combine the three metrics into a single score.

While there are various metrics that can be used with respect to determine the quality of the response, including metrics customized by patient, the following two metrics have been determined to be particularly useful for differentiation in the quality of the response: the number of target responses given and the sentence structure associated with the target response.

While you need at least two categories to in order to provide differentiation, in particular, it has been observed that it is useful to differentiate between the following five scoring categories: no target responses were produced/patient simply repeated answers provided by therapist, 1 word target response given/1 word response, 2 target words/2 word utterance, 3 or more target words/partial sentence with 1-2 grammar elements, and 3 or more target words/sentence with 3 or more grammar elements.

For example, in response to the question, "So tell me what category, or group, does a 'foot' belong to?"

The patient might provide no target answer or simply repeat the stimulus word "foot", which corresponds to the first category.

The patient might say only one of the following: "body", "the body", "shoe", or "walk", which would correspond to a 1 word target response given/1 word response. (Note: articles such as "the" and "a" are typically excluded from scoring, unless the therapist determines the article is a true origination of the patient. In such a case, it left to the therapist to as to whether or not to include them in the word count when scoring.)

The patient might say two of the following: "body", "shoe", "walk", OR produce a more complex two word response such as one of the following "body part", "wearing shoes", "has digits", which would correspond to a 2 target words/2 word utterance.

The patient might say all three of the following: "body", "shoe", and "walk"; one of the previous words and an additional more complex two word response, which does not include the previous word, such as one of the following "body part", "wearing shoes", "has digits"; OR produce an even more complex three or more word response such as one of the following "lower body part", "covered by clothes", "has five digits", which would correspond to a 3 or more target words/partial sentence with 1-2 grammar elements.

In order to meet the final quality category of 3 or more target words/sentence with 3 or more grammar elements the patient must exceed the above by producing at least one sentence level target response that has 3 or more grammatical elements, such as one of the following "things that are in pairs", "things to help you walk", or "something that needs to be trimmed".

The second and thirds steps in the scoring method are to 2) determining the level of assistance needed and 3) determining the delay in producing the response.

The level of assistance/cueing and delay between the time the question is asked and the answer is given are important metrics in differentiating between responses. For example, a patient that immediately independently answers a question with an appropriate target is at a significantly different level than another patient that produced the same response but only after requiring significant assistance/cueing and a long delay.

[Note: Cues are an important part of speech therapy and are used in the treatment of most speech-language disorders. Cues are hints that help someone obtain an answer. Exactly what type of cue and how the cue is used varies based on what disorder is being treated (i.e., articulation, fluency, language development, voice, and aphasia.) In aphasia therapy, speech pathologist use different types of cues to aid word finding. Some hints use the meaning of the word, some provide the first sound of the word, and some hints use the phonetic components of the word.]

While there are numerous methods for assessing the level of assistance/cuing needed, including individualizing the cueing levels by patient, and while you need at least two levels to in order to provide differentiation, the four standard levels of assistance/cues of independent, minimum, moderate, maximum cuing will be discussed.

Within the industry the four standard levels of assistance/cues of independent, minimum, moderate, maximum are well known and while they can vary from therapist to therapist (and even between patients for the same therapist) as to what is the difference between levels, what is important is that a therapist consistently assess the same levels for a particular patient for any results that they want to compare across treatment sessions.

With that said, we recommend the following scoring guide:
  Independent: The clinician used no cues. The patient obtained desired response independently.
  Minimum: The clinician uses one to two cues. This level of cueing assisted the patient in obtaining the desired response.
  Moderate: The clinician uses two to three cues. This level of cueing assisted the patient in obtaining the desired response.
  Maximum: The clinician uses three or more cues. This level of cueing assisted the patient in obtaining the desired response.
  [Note: if the entire response is comprised of words that are entirely generated by the clinician/caregiver then that would be a non-scored response.]

Similarly, delay in initiation of response/speech is an error that affects many people with aphasia. Word finding difficulty reduces the timeliness with which a person with aphasia can retrieve a word needed to communicate. This interrupts the flow of communication and speech.]

While there are numerous methods for assessing the delay in in initiation of response/speech, including individualizing the levels by patient or timing with a stop watch, and while you need at least two levels to in order to provide differentiation, the four standard levels of delay in response of timely, minimum, moderate, maximum will be discussed.

Again, within the industry the four standard levels of delay in response of timely, minimum, moderate, maximum are well known and while they can vary from therapist to therapist (and even between patients for the same therapist) as to what is the difference between levels is, what is important is that a therapist consistently assess the same levels for a particular patient for any results that they want to compare across treatment sessions.

With that said, we recommend the following scoring guide:
  Timely: The patient responded without delay. (within 1.5 seconds)
  Minimum: 1.5 to 3.0 seconds
  Moderate: 3.5 to 6.0 seconds
  Maximum: 7.0+ seconds The following is offered as additional guidance. A delay is a slowness or lack of verbal output by the patient in response to a question or stimulus item. This is typically marked by silence. By observing the patient, most clinicians or caregivers can see that the patient is struggling or appears to be processing a response.

An answer began 1.5 seconds after the end of a question or stimulus question is delayed. However, a patient who presents to be actively thinking, and who appears to be working through an answer, is not delaying. Some questions have multiple answers, and a patient may be choosing what to say. Even though the patient has not responded, there is no pathology in the lack or response. The clinician must use their professional judgment to discern between actively thinking and a delayed response and score appropriately.

Having just discussed the first three steps in the scoring method we will now turn our attention to the final step of combining the three metrics (quality, assistance, and delay) into a single score. There are numerous techniques for combining the metrics into a single score. For example, each quality category could have a base score (e.g. 0, 5, 10, 15, 20 respectively), the level of assistance and/or delay in response might represent a deviation from that base score. For example, the levels of assistance might add (+3, +2, +1, 0 respectively) to the base score, and the delay in response might subtract (0, −1, −2, −3 respectively) from the base score and then a score determined for each stimulus word separately and then totaled up at the end of the session.

In the example above the base score associated with each category was shown as linearly increasing. However, in clinical practice there is a significant difference between a one/two word utterance and utterance with partial/full sentence structure (or producing 3 or more target responses), as such, we recommend the following scoring be used 0, 2, 3, 5, and 7 respectively or other scoring that highlights the significant difference between these levels. The importance being not the particular base score used but that it provides motivation to the patient to increase appropriate word production (and facilitate conversations) and that it can be utilized to access progress.

Additionally, in the example above, we discussed the possibility that the level of assistance might add and the delay in response might subtract from the base score. They actually could have been reversed, both added, both subtracted, or possibly one or more could have been a multiplying factor.

As word stimulation is the primary goal of the activity, care should be taken that the addition/subtraction/multiplication of the level of assistance or delay in production does not mask the production of communication. As such, in clinical practice, we recommend that, with respect to a score for the session, the effect of the level of assistance and/or delay in production not be assessed against each stimulus word but that the medium, mean, or other group statistic be utilized.

In practice, we have observed the medium to be the easier value to determine. To determine the medium you simply determine which level of assistance and/or delay in response occurred most frequently, and you access either a bonus or a penalty to the total base scores of all the stimulus words for the session. (Note: This particular method of determining a session score is incredibly useful in communicating the session's progress to the patient, as it leads to a discussion first about word/sentence production and secondarily about the level of assistance and/or delay in response.)

Additionally, when the effect of the level of assistance and/or delay in production is being used to modify the total base score at the end of the session, we have found that there is less of a need to assess level of assistance and/or delay in production individually. This is because the level of assistance and delay in response almost always go hand-in-hand with one another. As such, we recommend, for ease of communication to the patient that a single assessment be made per stimulus word that typically takes into account first the level of assistance (independent, minimum, moderate, maximum) and then assess whether or not the delay in response (timely, minimum, moderate, maximum) would cause the level to decrease and, if so, then the combined score would reflect the least independent/timely of the two.

For example, if a minimum level of assistance was provided and the response was provided after a moderate delay then the combined assessment for this stimulus word would be moderate. However, if a minimum level of assistance was provided then even if the delay in response was timely then the combined assessment for this stimulus word would stay at minimum. As such, we recommend a combined assessment of one of the following: independent/timely, minimum, moderate, maximum.

Regardless of whether or not the impact to the session score of the level of assistance and/or delay in response is being calculated for each stimulus word or at the end of the session, the base score and the level of assistance and/or delay required should be communicated to the patient for each stimulus word, which should not only be done verbally but can also be effectively done by moving (inclusive of orientation) the stimulus word to a new location.

With respect to FIG. 1A-C, we have already discussed one board game location 110, shown a being represented with a star graphic, we will now turn our attention to discussing the scoring region 120, as well as additional uses for this board game location 110 indicated with the star.

The scoring region 120 must have at least two scoring location (though one of them can be returning the stimulus card back to the pile in the event of no score). While two is the minimum, as previously discussed, we recommend the following five scoring categories: no target responses were produced/patient simply repeated answers provided by therapist, 1 word target response given/1 word response, 2 target words/2 word utterance, 3 or more target words/partial sentence with 1-2 grammar elements, and 3 or more target words/sentence with 3 or more grammar elements. [Note: while these five categories will be discussed, in a representative fashion, the system is not limited to five categories and would simply need to have additional locations for the additional categories.]

Each scoring category (and/or level of assistance/delay in response) ideally has a physical location that each stimulus word gets moved to in order to indicate to the patient their performance for that stimulus word.

Although, it could be done otherwise, we recommend that the scoring area 120 be used for the later four scoring categories but not the first, which is when the patient didn't independently produce any target responses and/or simply repeated answers provided by therapist, which will be referred to as $Q^0$.

While repeating answers, is still valuable, it is significantly different from producing a targeted response. As such, we recommend giving a zero value to the $Q^0$ category and moving the associated stimulus words into a different location not associated with the scoring location 120. [Note: moving it to a location not associated with producing a response, communicates a different message to the patient and, not getting a score, can be very highly motivating for a patient to try and do better.]

One location that can be used for the $Q^0$ category is simply to return them back to the bottom of the pile that they came from. However, a preferred technique is to use a separate non-scoring location. In this case, represented by the board game location 110, with the star graphic. This is particularly, true if the stimulus words were face-up in the piles to begin with (or given to the patient) but the stimulus words could also be left in place if the words were originally face-down and moved to this location as the starting location.

It is worth noting that moving $Q^0$ category stimulus words to a separate non-scoring location is particularly advantageous in that the number of words that fell into the $Q^0$ category can be easily counted at the end of the session and it also facilitates their reporting.

However, not only does moving it to the board game location 110, with the star graphic, facilitate reporting, it is also much more motivating to the patient.

As stated earlier, while repeating answers is different than originating an answer, for patients with severe Aphasia, this may be the cognitive entry point towards increased speech output. Since the purpose of the tool is to increase verbal output, and since the patient is still producing verbal output it motivating to the patient to have this repetition recognized and moving it to the board game location 110, with the star graphic is advantageous over simply returning to the pile.

The star is a positive icon and can be a motivating factor for the patient to verbally produce output. However, as it does not produce a score, it still communicates a different message to the patient and, not getting a score, can be very highly motivating for a patient to try to do better.

With respect to the four latter scoring categories, for the purposes of discussion, we will respectively label them as $Q^2$, $Q^3$, $Q^5$, and $Q^7$, where the superscript represents their recommended base score.

Each of the scoring categories $Q^2$, $Q^3$, $Q^5$, and $Q^7$ is represented as having a separate scoring location 120-1, 120-2, 120-3, 120-n in the scoring area 120. [Note: the scoring area is represented as being a part of the board but could just as easily have been a separate component and the individual scoring location 120-1, 120-2, 120-3, 120-n could even be separate into individual units.]

There four scoring locations 120-1, 120-2, 120-3, 120-n, moving from left to right, are intended to correspond to the scoring categories $Q^2$, $Q^3$, $Q^5$, and $Q^7$ respectively. As an aid in facilitating scoring/communication, for each scoring location there is a notation related to both quality metrics: number of target responses given 121-1, 121-2, 121-3, 121-n and the sentence structure associated target response 122-1, 122-2, 122-3, 122-n. As an additional aid, there is a base score indicator 123-1, 123-2, 123-3, 123-n for each scoring location and in the drawings they labeled from left to right with the recommended numbers of 2, 3, 5, and 7.

While placing the stimulus word into one or the scoring locations 120-1, 120-2, 120-3, 120-n indicates the base score. It does not, by itself provide any indication of the level of assistance and/or delay in production. While one option would be to have separate or sub location, we have found that orientation of the stimulus word can be a powerful tool in communicating the level of assistance and/or delay in production.

This is especially true when the four combined metrics of independent/timely 124, minimum 125, moderate 126, maximum 127 are indicated in a clock-wise (or counter-clockwise) direction are used. Where the top of the stimulus word (indicated by the stimulus word being right-side-up) is rotated to point to the level of assistance and/or delay in production.

As an example, In FIG. 1C it can be seen that the word card 200 with the stimulus word 210 "Foot" has been placed in the left most word location 120 and has been rotated 90 degrees such that the top of the card 200 points to minimum 125 cues/delay. As a result, this stimulus word 210, have a base score of 2 and a level of assistance and/or delay in production of minimum.

While a trained therapist, will be able to expand on what is disclosed herein. What is important to keep in mind when reviewing this document is that language/communication is comprised of comprehension and expression. For patients with poor comprehension, their abilities to recall expression are decreased. Since the tool functions to improve comprehension skills for spoken and written language, it can serve as an entry point for many patients whose poor comprehension skills prevent them from engaging in expressive language tasks. As a result, the tool creates a therapeutic experience that is both engaging and effective.

Finally, it is to be understood that various different variants of the invention, including representative embodiments and extensions have been presented to assist in understanding the invention. It should be understood that such implementations are not to be considered limitations on either the invention or equivalents except to the extent they are expressly in the claims. It should therefore be understood that, for the convenience of the reader, the above description has only focused on a representative sample of all possible embodiments, a sample that teaches the principles of the invention. The description has not attempted to exhaustively enumerate all possible permutations, combinations or variations of the invention, since others will necessarily arise out of combining aspects of different variants described herein to form new variants, through the use of particular hardware or software, or through specific types of applications in which the invention can be used. That alternate embodiments may not have been presented for a specific portion of the description, or that further undescribed alternate or variant embodiments may be available for a portion of the invention, is not to be considered a disclaimer of those alternate or variant embodiments to the extent they also incorporate the minimum essential aspects of the invention, as claimed in the appended claims, or an equivalent thereof.

What is claimed:

1. A method of using a tool for improving language skills comprising:
   selecting, using the tool, from at least two semantic concepts, a first language concept to be addressed;
   visually presenting, using the tool, a first word card associated with the first language concept to a patient, wherein the first word card is a physical card;
   asking the patient to answer a first question related to the first language concept about the first word card;
   receiving a spoken patient's first response;
   scoring the patient's first response to the first question asked with a first word score based upon at least one or more of the following: the number of spoken words given in the first response, the number of prompts the patient needed to be provided in order to elicit the first response, the amount of time the patient needed to produce the first response;
   wherein the first score is a combination of a base score associated with the number of spoken words and a deviation from the base score based on one or more of the number of prompts the patient needed to be provided in order to elicit the first response or the amount of time the patient needed to produce the first response;
   wherein the tool comprises a physical game board with a scoring area arranged in a matrix with at least a first location and moving the first word card to the first location;
   wherein the first location has more than one rotational orientation with respect to being right-side-up and the first location represents the base score and the orientation represents the deviation; and
   rotating the first word card within the first location to visually indicate the deviation to the patient,
   wherein the physical game board further comprises a semantics concept selection tool comprising a spinner having a plurality of options, wherein each option is associated with corresponding each semantic concept of the at least two semantic concepts.

2. The method of claim 1 further comprising:
   assigning a first therapeutic session length that allows for the presentation, scoring, and moving of at least the first word card and a second word card, wherein the second word card is a physical card;
   visually presenting the second word card that is one of either associated with the first language concept or associated with a second language concept that is selected from among the two or more semantic concepts;
   asking the patient to answer a second question about the second word card that is related to the language concept associated with second word card;
   receiving a spoken patient's second response;
   scoring the patient's second response to the second question asked with a second word score based upon at least one or more of the following: the number of spoken words given in the second response, the number of prompts the patient needed to be provided in order to elicit the second response, the amount of time the patient needed to produce the second response;
   wherein the scoring area comprises at least a second location and moving the second word card to the second location;
   wherein the second location has more than one rotational orientation with respect to being right-side-up and the second location represents the base score and the orientation represents the deviation;
   rotating the second word card within the second location to visually indicate the deviation to the patient; and
   determining whether or not the first therapeutic session length has been achieved and if so calculating a total first therapeutic session score by totaling up all the individual word scores from the first therapeutic session and producing a therapeutic session report.

3. The method of claim 2 further comprising conducting a second therapeutic session at a later date that has roughly the same length as the first session and comparing the score between sessions and producing a progress report.

4. The method of claim 2 where the first therapeutic session length is based upon a specific number of words to be scored.

5. The method of claim 2 where the first therapeutic session length is based upon a specific length of time.

6. The method of claim 5 where the specific length of time is approximately 25 minutes or less.

7. The method of claim 1 wherein the tool uses a random process to perform the selecting.

8. The method of claim 7 wherein the random process involves one of rolling a die or spinning a spinner.

9. The method of claim 7 wherein the tool further comprises a computer processor, configured to execute computer code, and the random process involves a random number generator executed in code running on the computer processor.

10. The method of claim 1 wherein the at least two semantic concepts are related to at least two of visual characteristics, physical feelings, emotional feelings, smell, taste, location, function, action, category.

11. The method of claim 10 wherein there are at least eight semantic concepts and physical and emotional feelings are combined into a single category.

12. The method of claim 1 wherein the deviation is a combined deviation based first on an assessment of the number of prompts the patient needed to be provided in order to elicit the first response and then an assessment of the amount of time the patient needed to produce the first response.

13. The method of claim 1 wherein the accessed deviation based on the number of prompts is comprised of the following categories: independent, minimum, moderate, or maximum and the accessed deviation based on the amount of time the patient needed to produce the first response is comprised of the following categories: timely, minimum, moderate, or maximum and the combined deviations reflect the least independent or timely of the two assessed deviations.

14. The method of claim 2 wherein the individual word scores are a combination of a base score associated with the number of spoken words and a deviation from the base score based on one or more of the number of prompts the patient needed to be provided in order to elicit the first response or the amount of time the patient needed to produce the first response.

15. The method of claim 2 wherein the individual word scores are based on the number of spoken words and the first therapeutic session score further comprises assessing a deviation from the total of the individual word scores, wherein the deviation is based upon determining a group statistic for the first session based on one or more of the number of prompts the patient needed to be provided in order to elicit the first response or the amount of time the patient needed to produce the first response.

16. The method of claim 15 wherein the group statistic is a median.

17. The method of claim 1 wherein the number of spoken words has two quality metrics: the number of target responses given and the sentence structure associated with the target response.

18. The method of claim 17 wherein the number of target response comprises the following categories: no target responses produced, one word target response given, two target words, three or more target words and the sentence structure comprises the following categories: no target responses, one word response, two word utterance, partial sentence with one to two grammar elements, and sentence with three or more grammar elements.

* * * * *